United States Patent
Lu et al.

(10) Patent No.: US 12,302,378 B2
(45) Date of Patent: May 13, 2025

(54) UPLINK TRANSMISSION METHOD, UPLINK TRANSMISSION INDICATION METHOD, AND DEVICE

(71) Applicant: VIVO MOBILE COMMUNICATION CO., LTD., Guangdong (CN)

(72) Inventors: Zhi Lu, Guangdong (CN); Xueming Pan, Guangdong (CN); Xiaohang Chen, Guangdong (CN)

(73) Assignee: VIVO COMMUNICATION CO., LTD., Guangdong (CN)

( * ) Notice: Subject to any disclaimer, the term of this patent is extended or adjusted under 35 U.S.C. 154(b) by 477 days.

(21) Appl. No.: 17/725,166

(22) Filed: Apr. 20, 2022

(65) Prior Publication Data

US 2022/0248422 A1     Aug. 4, 2022

Related U.S. Application Data

(63) Continuation of application No. PCT/CN2020/122697, filed on Oct. 22, 2020.

(30) Foreign Application Priority Data

Oct. 23, 2019 (CN) .......................... 201911014216.2

(51) Int. Cl.
    *H04W 72/23*      (2023.01)
    *H04W 72/1268*      (2023.01)
    (Continued)

(52) U.S. Cl.
    CPC ..... *H04W 72/569* (2023.01); *H04W 72/1268* (2013.01); *H04W 72/23* (2023.01)

(58) Field of Classification Search
    CPC .................. H04W 72/23; H04W 72/1268; H04W 72/569
    (Continued)

(56) References Cited

U.S. PATENT DOCUMENTS

| 2014/0079002 A1 | 3/2014 | Chen et al. |
| 2018/0235023 A1 | 8/2018 | Suzuki et al. |

(Continued)

FOREIGN PATENT DOCUMENTS

| CN | 103024923 A | 4/2013 |
| CN | 105592468 A | 5/2016 |

(Continued)

OTHER PUBLICATIONS

Partial Supplementary European Search Report for Application No. 20880148.0-1215, dated Oct. 24, 2022, 17 Pages.

(Continued)

*Primary Examiner* — Dang T Ton
(74) *Attorney, Agent, or Firm* — BROOKS KUSHMAN P.C.

(57) ABSTRACT

An uplink transmission method, an uplink transmission indication method, and a device are provided. The method includes: receiving cancellation indication information corresponding to a first physical uplink shared channel (PUSCH) and receiving a scheduling grant of a second PUSCH, where a priority of the first PUSCH is lower than a priority of the second PUSCH; and performing a corresponding terminal behavior according to time domain positions of the cancellation indication information and the scheduling grant.

20 Claims, 10 Drawing Sheets

(51) Int. Cl.
*H04W 72/566* (2023.01)
*H04W 72/25* (2023.01)

(58) Field of Classification Search
USPC .................................... 370/329, 400, 401
See application file for complete search history.

(56) References Cited

U.S. PATENT DOCUMENTS

2018/0359781 A1* 12/2018 Yoon .................. H04W 16/14
2021/0007119 A1    1/2021 Li et al.

FOREIGN PATENT DOCUMENTS

| CN | 109618362 A | 4/2019 |
| CN | 110149705 A | 8/2019 |
| CN | 111642001 A | 9/2020 |
| GB | 2572453 A | 10/2019 |
| WO | 2017026322 A1 | 2/2017 |
| WO | 2018142376 A1 | 8/2018 |
| WO | 2020144529 A1 | 7/2020 |

OTHER PUBLICATIONS

Catt, "Discussion on Inter-UE UL Multiplexing," 3GPP TSG RAN WG1 #97, Agenda item 7.2.6.5, May 13-17, 2019, R1-1906331, Reno, Nevada, USA, 6 Pages.
First Office Action for Chinese Application No. 201911014216.2, dated Jan. 5, 2022, 11 Pages.
International Search Report and Written Opinion for Application No. PCT/CN2020/122697, dated Jan. 13, 2021, 9 Pages.
First Office Action for Indian Application No. 202227028278, dated Sep. 26, 2022, 5 Pages.
Panasonic, "On NR URLLC UL Inter UE Tx Prioritization/Multiplexing," 3GPP TSG RAN WG1 #94, Agenda item 7.2.6.3, Oct. 8-12, 2018, R1-1810475, Chengdu, China, 5 Pages.
Nokia et al., "Summary of Friday Offline Discussion on UL/DL Intra-UE Prioritization/Multiplexing," 3GPP TSG-RAN WG1 #96, Agenda item 7.2.6.4, Feb. 25-Mar. 1, 2019, R1-1903818, Athens, Greece, 30 Pages.
Qualcomm Incorporated, "Uplink Inter-UE Tx Multiplexing and Prioritization," 3GPP TSG-RAN WG1 #98b, Agenda item 7.2.6.5, Oct. 14-20, 2019, R1-1911122, Chongqing, China, 9 Pages.
VIVO, "Summary of [100b-e-NR-L1enh-URLLC-InterUE-01]," 3GPP TSG RAN WG1 #100bis, Agenda item 7.2.5.5, Apr. 20-30, 2020, R1-2002937, e-Meeting, 29 Pages.

* cited by examiner

UPLINK TRANSMISSION METHOD, UPLINK TRANSMISSION INDICATION METHOD, AND DEVICE

CROSS-REFERENCE TO RELATED APPLICATIONS

This application is continuation application of PCT International Application No. PCT/CN2020/122697 filed on Oct. 22, 2020, which claims priority to Chinese Patent Application No. 201911014216.2, filed on Oct. 23, 2019, which are incorporated herein by reference in their entireties.

TECHNICAL FIELD

Embodiments of the present disclosure relate to the field of communication technologies, and in particular, to an uplink transmission method, an uplink transmission indication method, and a device.

BACKGROUND

Compared with the conventional communication systems, the fifth-generation mobile communication system (5G) needs to be adapted to more diversified scenarios and service requirements. Main scenarios of 5G include enhanced Mobile Broadband (eMBB), ultra-reliable and low latency communications (URLLC), and massive Machine Type of Communication (mMTC). Such scenarios raise requirements, such as high reliability, a low latency, a large bandwidth, and wide coverage, on the system. For a URLLC service, to satisfy service indicator requirements, a symbol-level or a mini-slot-level PDSCH (Physical Downlink Shared Channel), physical uplink shared channel (PUSCH), or physical uplink shared channel (PUCCH) is used for transmission.

For a terminal that simultaneously supports various services, including both low-priority services and high-priority services. After the terminal receives a scheduling grant of a PUSCH of a specific service, if a higher-priority service occurs, there may be a PUSCH transmission conflict between different services.

SUMMARY

Embodiments of the present disclosure provide an uplink transmission method and a device.

According to a first aspect, the embodiments of the present disclosure provide an uplink transmission method, applied to a terminal, including:
receiving cancellation indication information corresponding to a first PUSCH and receiving a scheduling grant of a second PUSCH, where a priority of the first PUSCH is lower than a priority of the second PUSCH; and
performing a corresponding terminal behavior according to time domain positions of the cancellation indication information and the scheduling grant.

According to a second aspect, the embodiments of the present disclosure further provide an uplink transmission indication method, applied to a network device, including:
sending cancellation indication information corresponding to a first PUSCH, where a time frequency resource indicated by the cancellation indication information does not overlap with a time frequency resource multiplexed by the first PUSCH and second PUSCH; and/or the time frequency resource indicated by the cancellation indication information does not overlap with a time frequency resource of the second PUSCH, where a priority of the first PUSCH is lower than a priority of the second PUSCH.

According to a third aspect, the embodiments of the present disclosure further provide a terminal, including:
a receiving module, configured to receive cancellation indication information corresponding to a first PUSCH and receive a scheduling grant of a second PUSCH, where a priority of the first PUSCH is lower than a priority of the second PUSCH; and
a processing module, configured to perform a corresponding terminal behavior according to time domain positions of the cancellation indication information and the scheduling grant.

According to a fourth aspect, the embodiments of the present disclosure further provide a network device, including:
a transmitting module, configured to send cancellation indication information corresponding to a first PUSCH, where a time frequency resource indicated by the cancellation indication information does not overlap with a time frequency resource multiplexed by the first PUSCH and second PUSCH; and/or the time frequency resource indicated by the cancellation indication information does not overlap with a time frequency resource of the second PUSCH, where a priority of the first PUSCH is lower than a priority of the second PUSCH.

According to a fifth aspect, the embodiments of the present disclosure further provide a communication device, including: a processor, a memory, and a program stored on the memory and executable on the processor, where when executed by the processor, the program implements the steps of the uplink transmission method according to the first aspect, or the steps of the uplink transmission indication method according to the second aspect.

According to a sixth aspect, the embodiments of the present disclosure further provide a computer-readable storage medium, storing a computer program, where when executed by a processor, the computer program implements the steps of the uplink transmission method according to the first aspect, or the steps of the uplink transmission indication method according to the second aspect.

BRIEF DESCRIPTION OF THE DRAWINGS

Various other advantages and benefits become clear to a person of ordinary skill in the art by reading the following detailed description of optional implementations below. The accompanying drawings are merely intended to show the optional implementations and are do not intended to constitute a limitation on the present disclosure. Throughout the accompanying drawings, the same reference numerals are used to represent the same components. In the accompanying drawings.

DETAILED DESCRIPTION

In the specification and claims of this application, the terms "include" and any variants thereof are intended to cover a non-exclusive inclusion. For example, a process, method, system, product, or device that includes a series of steps or units is not necessarily limited to those steps or units that are clearly listed, but may include other steps or units not clearly listed or inherent to such a process, method, product, or device. In addition, the term "and/or" used in the specification and claims represent at least one of the connected objects. For example, A and/or B may represent the following three cases: Only A exists, only B exists, and both A and B exist.

In addition, in the embodiments of the present disclosure, the word "exemplary" or "for example" is used to represent giving an example, an illustration, or a description. Any embodiment or design scheme described with the term "exemplary" or "for example" in the embodiments of the present disclosure should not be explained as being more preferred or having more advantages than another embodiment or design scheme. Exactly, use of the word "exemplary" or "for example" or the like is intended to present a related concept in a specific manner.

The technologies described in the present disclosure are not limited to the fifth-generation mobile communication ($5^{th}$-generation, 5G) system and an evolution-advanced communication system, is not limited to the LTE/LTE-advanced (LTE-A) system, and may further be applied to various wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems.

The terms "system" and "network" may usually be used interchangeably. A CDMA system can implement radio technologies such as CDMA2000 and Universal Terrestrial Radio Access (UTRA). UTRA includes broadband CDMA (WCDMA) and other CDMA variants. A TDMA system can implement radio technologies such as Global System for Mobile Communications (GSM). An OFDMA system can implement radio technologies such as Ultra Mobile Broadband (UMB), evolved UTRA (E-UTRA), IEEE 802.11 (Wi-Fi), IEEE 802.16 (WiMAX), IEEE 802.20, and Flash-OFDMA. UTRA and E-UTRA are parts of a universal mobile telecommunications system (UMTS). LTE and LTE-advanced (for example, LTE-A) are new releases of UMTS using E-UTRA. UTRA, E-UTRA, UMTS, LTE, LTE-A, and GSM are described in documents of an organization named "$3^{rd}$ Generation Partnership Project" (3GPP). CDMA2000 and UMB are described in documents of an organization named "$3^{rd}$ Generation Partnership Project 2" (3GPP2). The technology described in the present disclosure can be applied to the systems and radio technologies mentioned above, and can also be applied to other systems and radio technologies.

Figure 1:
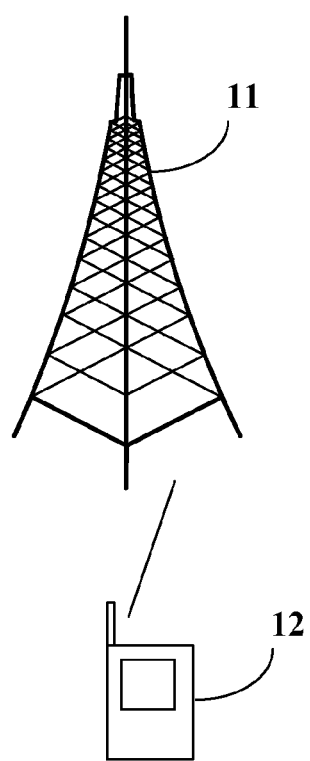
FIG. 1 is a schematic architectural diagram of a wireless communication system.

The following describes the embodiments of the present disclosure with reference to the accompanying drawings. A processing method and a device provided in the embodiments of the present disclosure can be applied to a wireless communication system. FIG. 1 is a schematic architectural diagram of a wireless communication system according to an embodiment of the present disclosure. As shown in FIG. 1, the wireless communication system may include a network device 10 and a terminal 11. The terminal 11 may be denoted as UE 11, and the terminal 11 may communicate (transmit signaling or data) with the network device 10. In actual application, connections between the foregoing devices may be wireless connections. For convenience of visually showing a connection relationship between the devices, solid lines are used for illustration in FIG. 1.

The network device 10 provided in the embodiments of the present disclosure may be a base station. The base station may be a device, such as a generally used base station, an evolved NodeB (evolved node base station, eNB), or a network device (for example, a next-generation NodeB (next generation node base station, gNB), or a transmission reception point (transmission and reception point, TRP)) in the 5G system.

The terminal 11 provided by the embodiments of the present disclosure may be a mobile phone, a tablet computer, a notebook computer, an ultra-mobile personal computer (UMPC), a netbook, a personal digital assistant (PDA), Mobile Internet Device (MID), a wearable device, an in-vehicle navigator, or the like.

Figure 2:
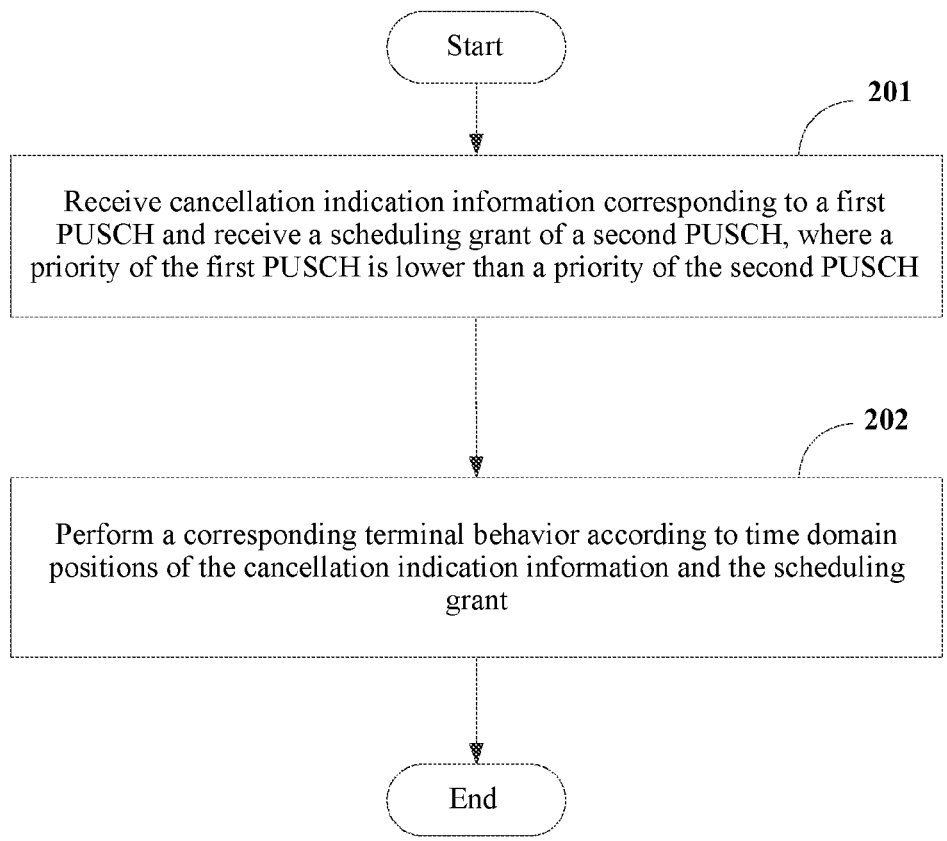
FIG. 2 is a flowchart of an uplink transmission method according to an embodiment of the present disclosure.

Referring to FIG. 2, the embodiments of the present disclosure provide an uplink transmission method. The method may be performed by a terminal supporting various services, including both a service with a low priority and a service with a high priority. The specific steps are as follows:

Step 201: Receive cancellation indication information corresponding to a first PUSCH and receive a scheduling grant of a second PUSCH, where a priority of the first PUSCH is lower than a priority of the second PUSCH.

The second PUSCH is equivalent to a PUSCH with a high priority, and the first PUSCH is equivalent to a PUSCH with a low priority. It may be understood that, in this embodiment of the present disclosure, a priority of a PUSCH may be determined according to a physical layer parameter, for example, downlink control information (DCI) for scheduling the PUSCH, or a physical layer parameter of network configuration.

For example, the terminal determines a service corresponding to a to-be-sent physical uplink channel according to DCI sent by a network side device. The DCI is DCI corresponding to the to-be-sent physical uplink channel.

If the format of the DCI is a specific DCI payload size, or the DCI is scrambled using a specific radio network temporary identifier (RNTI), for example, a modulation and coding scheme-cell radio network temporary identifier (MCS-C-RNTI), or the priority indication field in the DCI indicates a high priority, it is determined that the to-be-sent physical uplink channel corresponds to a high priority PUSCH, for example, a URLLC service.

If the format of the DCI is not a specific DCI payload size, or the DCI is not scrambled using a specific RNTI, or the priority indication field in the DCI indicates a low priority, it is determined that the to-be-sent physical uplink channel corresponds to a low priority PUSCH, for example, an eMBB service.

Optionally, a time frequency resource indicated by the cancel indicator (CI) information overlaps with at least a time frequency resource of the first PUSCH. The cancellation indication information may also be referred to as a cancellation indicator CI.

Step 202: Perform a corresponding terminal behavior according to time domain positions of the cancellation indication information and the scheduling grant.

In some implementations, a relationship between time domain positions of the cancellation indication information and the scheduling grant may include: (1) the time domain position of the cancellation indication information is before the time domain position of the scheduling grant; and (2) the time domain position of the scheduling grant is before the time domain position of the cancellation indication information. Optionally, different relationships between the time domain positions of the cancellation indication information and the scheduling grant may cause the terminal to perform different behaviors. Behaviors performed by the terminal when the scheduling grant is received before the CI information is received may be different from behaviors performed by the terminal when the CI information is received before the scheduling grant.

In some implementations, the terminal behavior includes one of the following:

(1) multiplexing the first PUSCH and the second PUSCH, so as to ensure processing of a high-priority service of the terminal;

(2) canceling (cancel), in a case that a time frequency resource multiplexed by the first PUSCH and the second PUSCH overlaps with a time frequency resource indicated by the cancellation indication information, transmission on the time frequency resource indicated by the cancellation indication information, so as to ensure processing of a high priority service of another terminal in the network;

(3) canceling transmission of the first PUSCH, so as to ensure transmission of the second PUSCH of the terminal, that is, ensure processing of a high-priority service of the terminal; or (4) canceling, in a case that a time frequency resource of the second PUSCH overlaps with a time frequency resource indicated by the cancellation indication information, transmission of the first PUSCH and the second PUSCH, so as to ensure processing of a high priority service of another terminal in the network.

It may be understood that, canceling the transmission of the second PUSCH may be canceling partial transmission of the second PUSCH or entire transmission of the second PUSCH. If the second PUSCH still has a demodulation reference signal (DMRS) at a position other than the time frequency resource indicated by the cancellation indication information, the terminal can still transmit a PUSCH of a time frequency resource of the second PUSCH other than the time frequency resource indicated by the cancellation indication information.

In some implementations, before the step of receiving cancellation indication information corresponding to a first PUSCH, the method further includes: receiving a PDCCH scheduling the first PUSCH. Correspondingly, the step of receiving cancellation indication information corresponding to a first PUSCH includes: receiving the cancellation indication information corresponding to the first PUSCH before the first PUSCH scheduled by the PDCCH is sent.

That is, a time of receiving cancellation indication information corresponding to a first PUSCH and receiving a scheduling grant of a second PUSCH is after a PDCCH of the first PUSCH is received and before a PUSCH scheduled by the PDCCH is sent.

In some implementations, the step of performing a corresponding terminal behavior according to time domain positions of the cancellation indication information and the scheduling grant includes:

multiplexing the first PUSCH and the second PUSCH in a case that the time domain position of the scheduling grant is located before the time domain position of the cancellation indication information. It may be understood that in this embodiment of the present disclosure, the first PUSCH and the second PUSCH may be multiplexed using a resource multiplexing rule in the related art.

In some implementations, that the time domain position of the scheduling grant is located before the time domain position of the cancellation indication information means that the last symbol of a PDCCH receiving the scheduling grant is before the last symbol of a PDCCH receiving the cancellation indication information.

In some implementations, the step of performing a corresponding terminal behavior further includes:

canceling, in a case that a time frequency resource multiplexed overlaps with a time frequency resource indicated by the cancellation indication information, transmission on the time frequency resource indicated by the cancellation indication information.

A specific implementation is canceling transmission on a resource that is in the time frequency resource indicated by the cancellation indication information and that overlaps with the time frequency resource multiplexed.

Figure 3:
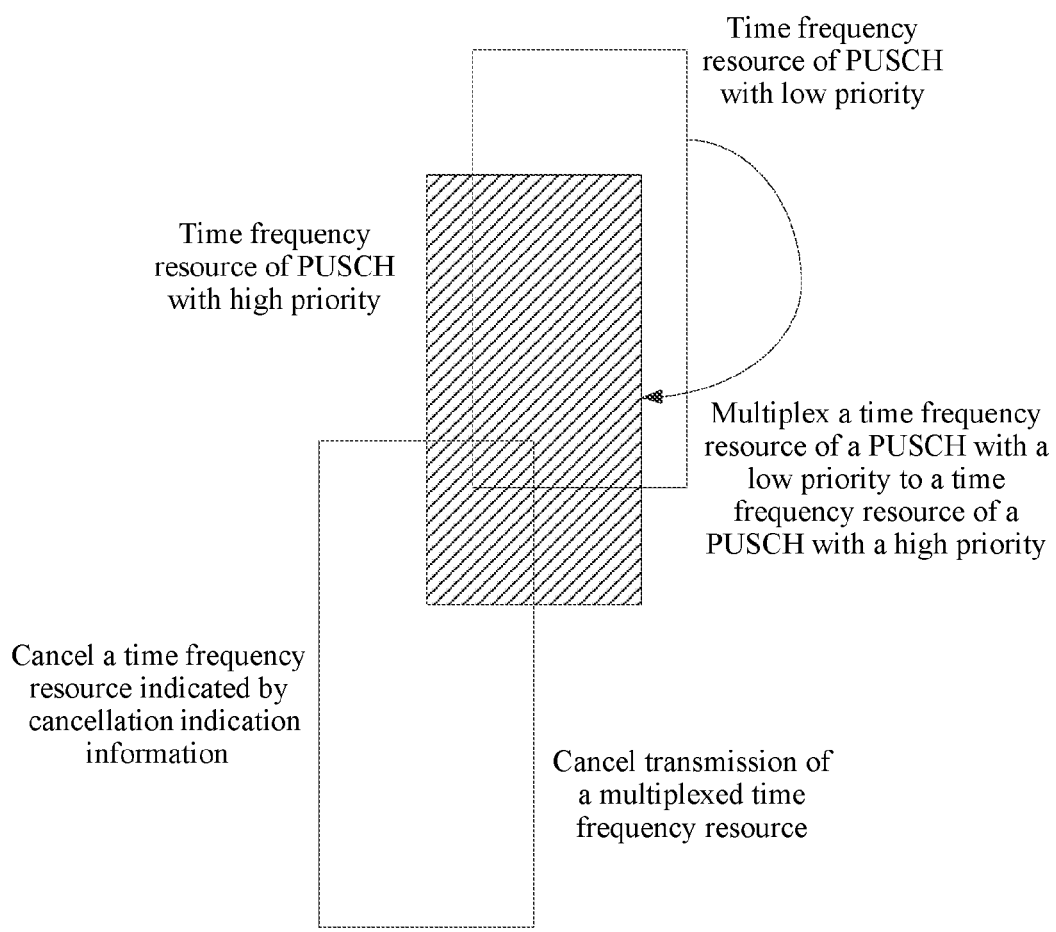
FIG. 3 is a schematic diagram of transmission on a time frequency resource of which multiplexing is canceled according to an embodiment of the present disclosure.

Referring to FIG. 3, in a case that a time frequency resource indicated by the cancellation indication information overlaps with a time frequency resource of a PUSCH with a low priority, the time frequency resource of the PUSCH with a low priority is multiplexed to a time frequency resource of a PUSCH with a high priority, and transmission of the time frequency resource multiplexed is canceled, so as to ensure processing of a high priority service of another terminal in the network.

In some implementations, the step of performing a corresponding terminal behavior according to time domain positions of the cancellation indication information and the scheduling grant includes:

performing one of the following terminal behaviors in a case that the time domain position of the cancellation indication information is located before the time domain position of the scheduling grant: (1) canceling transmission of the first PUSCH; or (2) canceling transmission on a time frequency resource indicated by the cancellation indication information.

In some implementations, that the time domain position of the cancellation indication information is located before the time domain position of the scheduling grant means that the last symbol of a PDCCH receiving the scheduling grant is before the last symbol of a PDCCH receiving the cancellation indication information.

In some implementations, the step of canceling transmission of the first PUSCH includes:

canceling transmission of the first PUSCH in a case that a time frequency resource of the second PUSCH does not overlap with the time frequency resource indicated by the cancellation indication information; or canceling transmission of the first PUSCH and performing transmission of the second PUSCH in a case that a time frequency resource of the second PUSCH overlaps with the time frequency resource indicated by the cancellation indication information. The canceling transmission of the first PUSCH may include: canceling only transmission of the first PUSCH on an overlapping resource or canceling entire transmission of the first PUSCH. The performing transmission of the second PUSCH includes: performing transmission of the second PUSCH on an overlapping resource.

Figure 4:
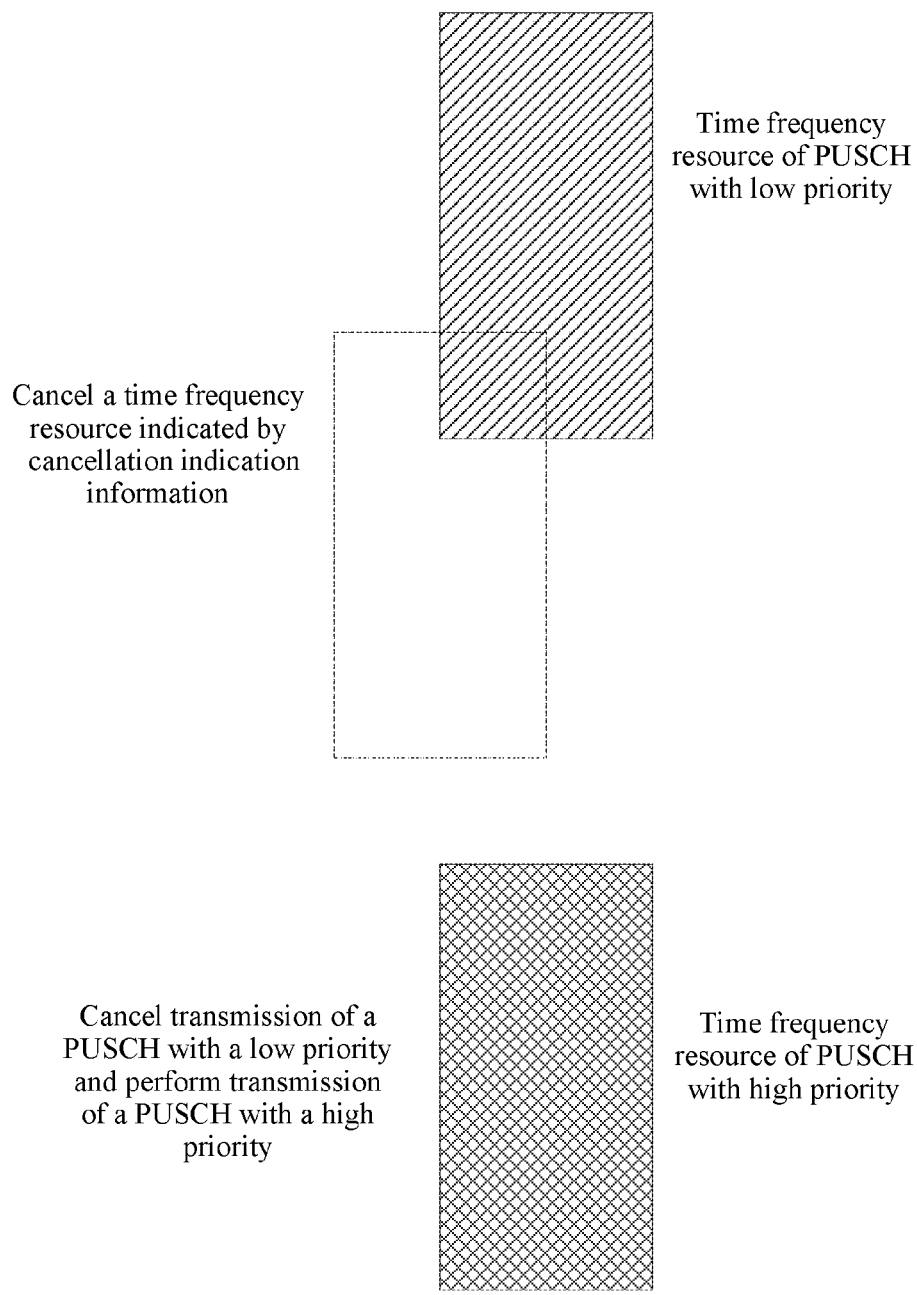
FIG. 4 is a schematic diagram of canceling transmission of a PUSCH with a low priority and performing transmission of a PUSCH with a high priority according to an embodiment of the present disclosure.

Referring to FIG. 4, in a case that a time frequency resource indicated by the cancellation indication information overlaps with a time frequency resource of a PUSCH with a low priority and does not overlap with a time frequency resource of a PUSCH with a high priority, transmission of the PUSCH with a low priority is canceled, and transmission of the PUSCH with a high priority is performed, so as to ensure transmission of the PUSCH with a high priority of the terminal.

Figure 5:
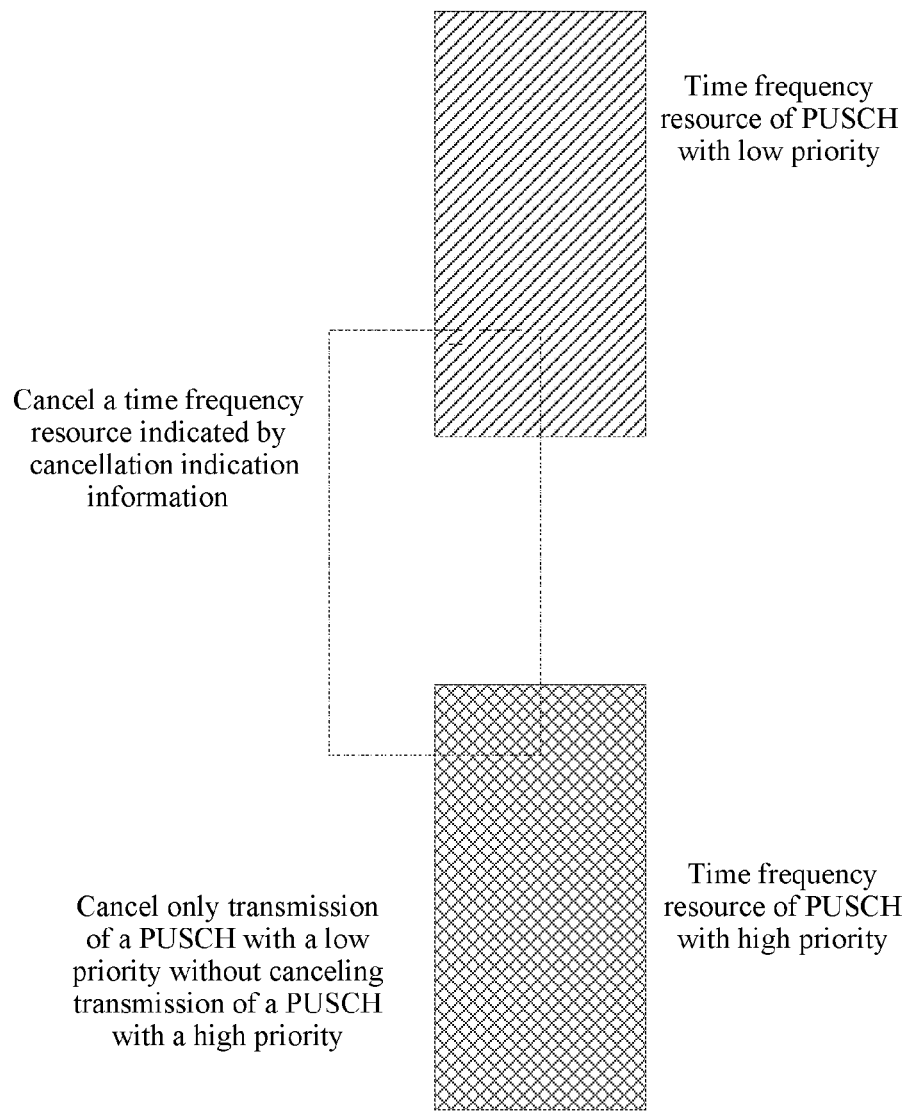
FIG. 5 is a schematic diagram of canceling transmission of a PUSCH with a low priority without canceling transmission of a PUSCH with a high priority according to an embodiment of the present disclosure.

Referring to FIG. 5, in a case that a time frequency resource indicated by the cancellation indication information overlaps with a time frequency resource of a PUSCH with a low priority and overlaps with a time frequency resource of a PUSCH with a high priority, only transmission of the PUSCH with a low priority is canceled without canceling transmission of the PUSCH with a high priority, so as to ensure transmission of the PUSCH with a high priority of the terminal.

In some implementations, the step of canceling transmission on the time frequency resource indicated by the cancellation indication information includes:

canceling transmission of the first PUSCH and the second PUSCH in a case that a time frequency resource of the second PUSCH overlaps with the time frequency resource indicated by the cancellation indication information. The canceling transmission of the first PUSCH may include: canceling only transmission of the first PUSCH on an overlapping resource or canceling entire transmission of the first PUSCH. The canceling transmission of the second PUSCH may include: canceling only transmission of the second PUSCH on an overlapping resource or canceling entire transmission of the second PUSCH.

Figure 6:
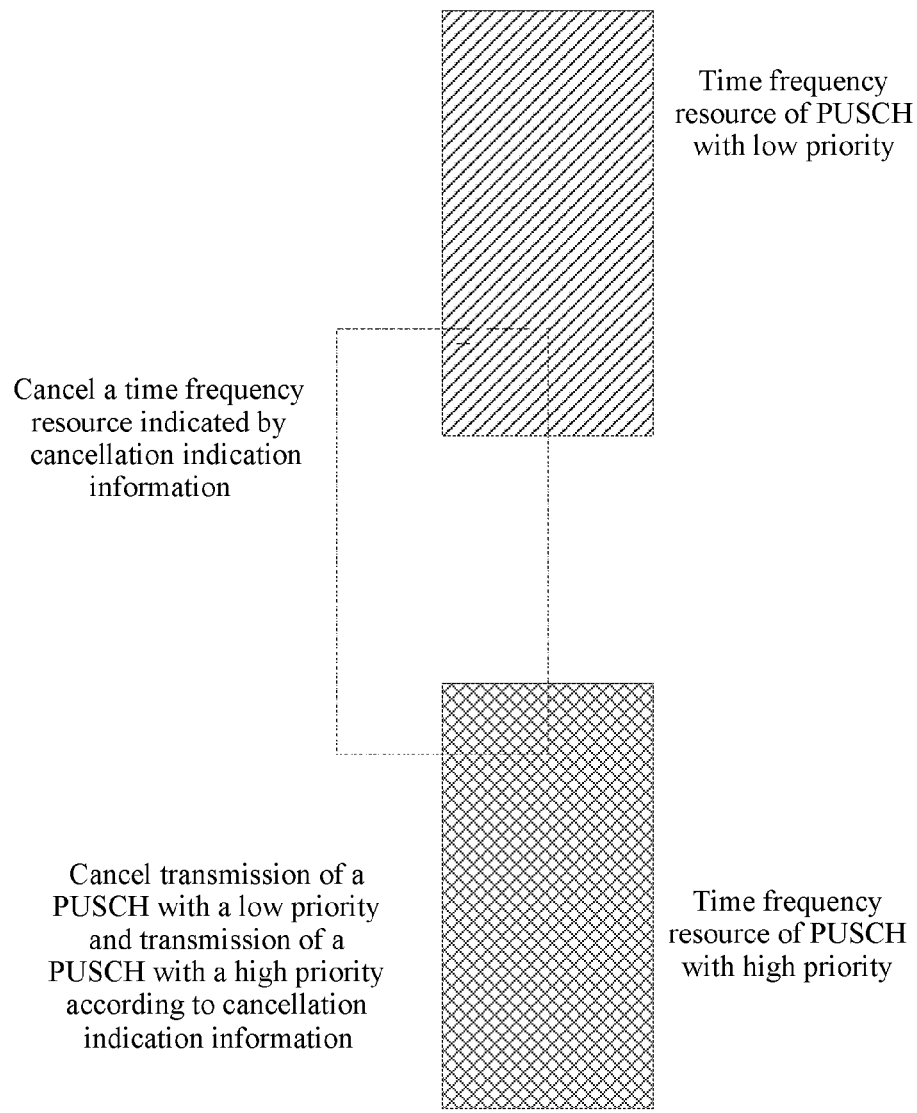
FIG. 6 is a schematic diagram of canceling transmission of a PUSCH with a low priority and transmission of a PUSCH with a high priority according to cancellation indication information according to an embodiment of the present disclosure.

Referring to FIG. 6, in a case that a time frequency resource indicated by the cancellation indication information overlaps with a time frequency resource of a PUSCH with a low priority and overlaps with a time frequency resource of a PUSCH with a high priority, transmission of the PUSCH with a low priority and transmission of the PUSCH with a high priority are canceled according to the cancellation indication information, so as to ensure processing of a high priority service of another terminal in the network.

In some implementations, before or after step 201, the method shown in FIG. 2 further includes receiving first information, where the first information indicates whether the terminal cancels transmission of the second PUSCH in a case that a time frequency resource of the second PUSCH on the terminal overlaps with a time frequency resource indicated by the cancellation indication information.

For example, the terminal receives the first information through Radio Resource Control (RRC) signaling.

For example, the first information includes an indicator bit, where "1" instructs the terminal to cancel transmission of the second PUSCH, and "0" instructs the terminal not to cancel transmission of the second PUSCH. Certainly, in the embodiments of the present disclosure, content of the first information is not specifically limited.

For example, when a priority of a PUSCH of another terminal is higher than the priority of the second PUSCH of the terminal, the network side instructs, using the first indication information, the terminal to cancel transmission of the second PUSCH, to ensure transmission of the PUSCH of the another terminal.

In some scenarios, a terminal that simultaneously supports various services may have a both low-priority services and high-priority services. In some other scenarios, a priority of a high priority service of another terminal in the network may be higher than a priority of a high priority service of the terminal. Processing of a high priority service can always be ensured using the foregoing embodiments.

In the embodiments of the present disclosure, a processing procedure after the terminal receives the scheduling grant of a PUSCH with a higher priority and the cancellation indication information is perfected, which can ensure a service with a higher priority is preferentially processed, thereby effectively improving the timeliness and reliability of communication of the wireless communication system.

Figure 7:
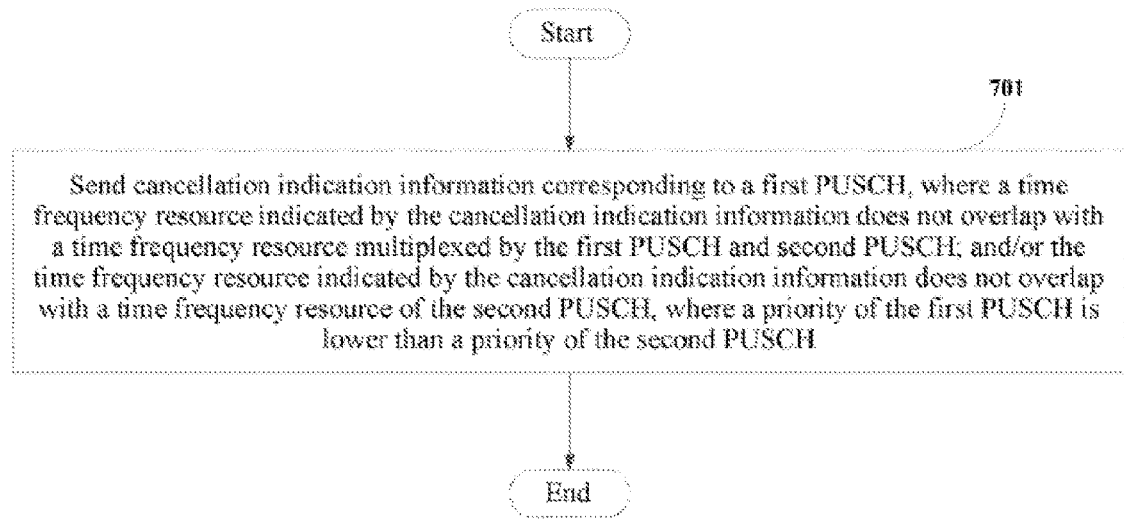
FIG. 7 is a flowchart of a method for processing an uplink transmission indication according to an embodiment of the present disclosure.

Referring to FIG. 7, the embodiments of the present disclosure further provide a processing method. The method is performed by a network device, and includes the following specific steps:

Step 701: Send cancellation indication information corresponding to a first PUSCH, where a time frequency resource indicated by the cancellation indication information does not overlap with a time frequency resource multiplexed by the first PUSCH and second PUSCH; and/or the time frequency resource indicated by the cancellation indication information does not overlap with a time frequency resource of the second PUSCH, where a priority of the first PUSCH is lower than a priority of the second PUSCH, that is, second PUSCH is equivalent to a PUSCH with a high priority, and the first PUSCH is equivalent to a PUSCH with a low priority. Alternatively, a time frequency resource indicated by the cancellation indication information overlaps with a time frequency resource multiplexed by the first PUSCH and second PUSCH; and/or the time frequency resource indicated by the cancellation indication information overlaps with a time frequency resource of the second PUSCH.

Optionally, the time frequency resource indicated by the cancellation indication information overlaps with at least a time frequency resource of the first PUSCH.

In this embodiment of the present disclosure, the network side sends the cancellation indication information, where the time frequency resource indicated by the cancellation indication information does not conflict with the time frequency resource of the second PUSCH of the terminal, to ensure transmission of the second PUSCH of the terminal.

In some implementations, before or after step 701, the method shown in FIG. 7 further includes:

sending first information to a terminal, where the first information indicates whether the terminal cancels transmission of the second PUSCH in a case that a time frequency resource of the second PUSCH on the terminal overlaps with the time frequency resource indicated by the cancellation indication information. For example, the first information is sent to the terminal through RRC signaling.

For example, the first information includes an indicator bit, where "1" instructs the terminal to cancel transmission of the second PUSCH, and "0" instructs the terminal not to cancel transmission of the second PUSCH. Certainly, in the embodiments of the present disclosure, content of the first information is not specifically limited.

For example, when a priority of a PUSCH of another terminal is higher than the priority of the second PUSCH of the terminal, the network side instructs, using the first indication information, the terminal to cancel transmission of the second PUSCH, to ensure transmission of the PUSCH of the another terminal.

A processing procedure after UE receives a scheduling grant of a PUSCH with a high priority and DCI including a CI is described below with reference to specific examples.

Example 1

After a network device (for example, a base station (gNB)) schedules an eMBB PUSCH, a high priority service arrives, which, for example, may be that a high priority service of the UE arrives, and then, a high priority service of other UE arrives. If the UE first receives a scheduling grant of a PUSCH with a high priority, that is, a PDCCH receiving a cancellation indicator is last symbols (last symbols), the UE first multiplexes a time frequency resource of a channel/signal with a high priority with a time frequency resource of a channel/signal with a low priority (for example, multiplexing of UCI information), and may perform A or B if a time frequency resource of the multiplexed channel/signal still overlaps with a time frequency resource indicated by a CI.

A: The UE cancels, according to the CI, transmission of the multiplexed channel/signal (for example, a PUSCH with a high priority). In this case, the UE considers that the CI has a higher priority, so as to ensure a high priority service of other UE.

B: The UE does not expect that the time frequency resource indicated by the CI overlaps with the multiplexed channel/signal (for example, a PUSCH with a high priority), so as to ensure transmission of a PUSCH with a high priority of the UE.

Figure 8:
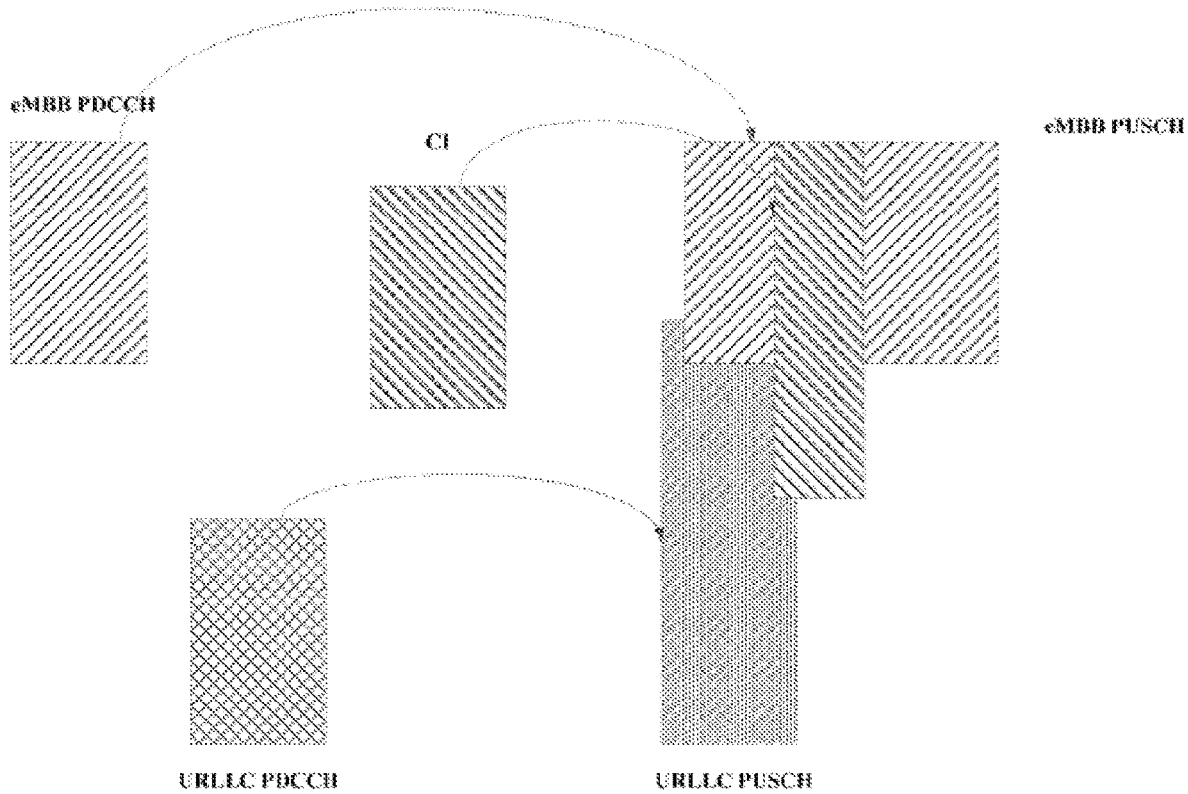
FIG. 8 is a schematic diagram 1 based on cancellation indication information according to an embodiment of the present disclosure.

Referring to FIG. 8, a time frequency resource of an eMBB PUSCH is multiplexed with a time frequency resource of a URLLC PUSCH, the time frequency resource indicated by the CI partially overlaps with the multiplexed time frequency resource, and transmission of the multiplexed time frequency resource is canceled (for example, transmission of the URLLC PUSCH is canceled) according to the CI, so as to ensure a high priority service of another terminal in the network.

Example 2

After a gNB schedules an eMBB PUSCH, a high priority service arrives, which, for example, may be that a high priority service of other UE arrives, and then, another high priority service of the UE arrives.

If a scheduling grant of a PUSCH with a high priority of the UE is then received, that is, a PDCCH receiving the scheduling grant of the PUSCH with a high priority is last symbols, C or D is performed.

C: If a time frequency resource of a PUSCH with a high priority of the UE does not overlap with a time frequency resource indicated by a CI, the UE cancels transmission of a PUSCH with a low priority and sends the PUSCH with a high priority.

Figure 9:
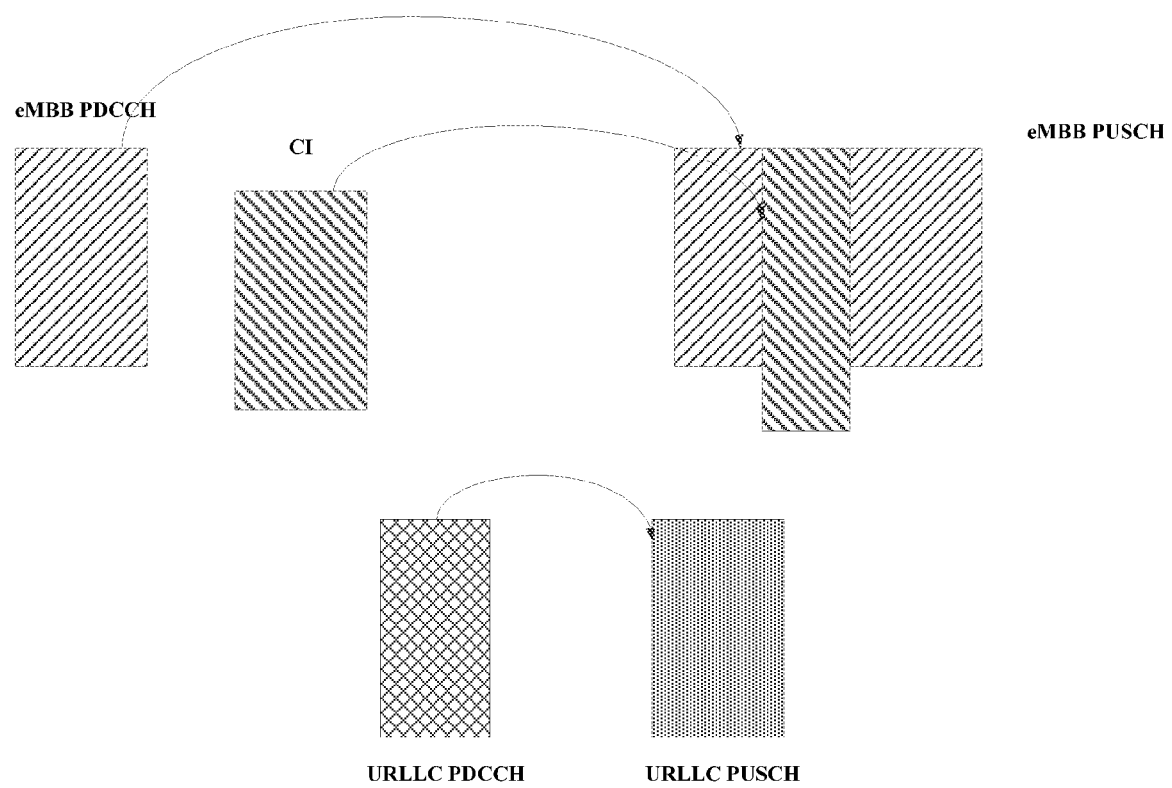
FIG. 9 is a schematic diagram 2 based on cancellation indication information according to an embodiment of the present disclosure.

Referring to FIG. 9, a time frequency resource of a URLLC PUSCH does not overlap with the time frequency resource indicated by the CI, transmission of an eMBB PUSCH is canceled, and transmission of the URLLC PUSCH is performed.

D: If the time frequency resource indicated by the CI overlaps with the time frequency resource of the PUSCH with a high priority of the UE, and the time frequency resource indicated by the CI overlaps with a time frequency resource of the eMBB PUSCH, perform D1, D2, or D3.

D1: The UE cancels, according to the CI, only transmission of a PUSCH with a low priority, and does not cancel transmission of a PUSCH with a high priority.

D2: The UE cancels transmission of a PUSCH with a low priority, and does not expect the CI overlaps with a PUSCH with a high priority thereof.

D3: The UE may cancel, according to the CI, transmission of a PUSCH with a low priority and a PUSCH with a high priority. In this case, the UE considers that the CI has a higher priority.

Figure 10:
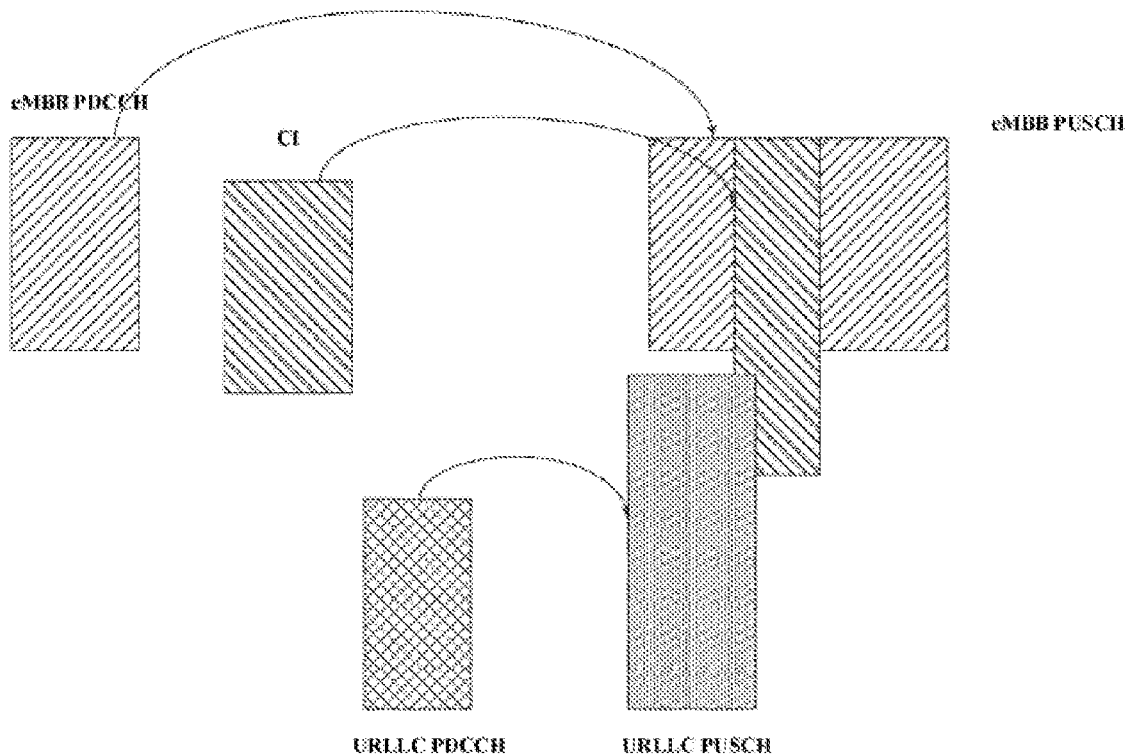
FIG. 10 is a schematic diagram 3 based on cancellation indication information according to an embodiment of the present disclosure.

Referring to FIG. 10, if a time frequency resource of a URLLC PUSCH overlaps with the time frequency resource indicated by the CI, transmission of an eMBB PUSCH is canceled. Alternatively, transmission of the URLLC PUSCH and transmission of the eMBB PUSCH may be canceled according to the CI. In this case, the UE considers that the CI has a higher priority. In this way, it is ensured that a high priority service of another terminal in the network is preferentially processed.

Figure 11:
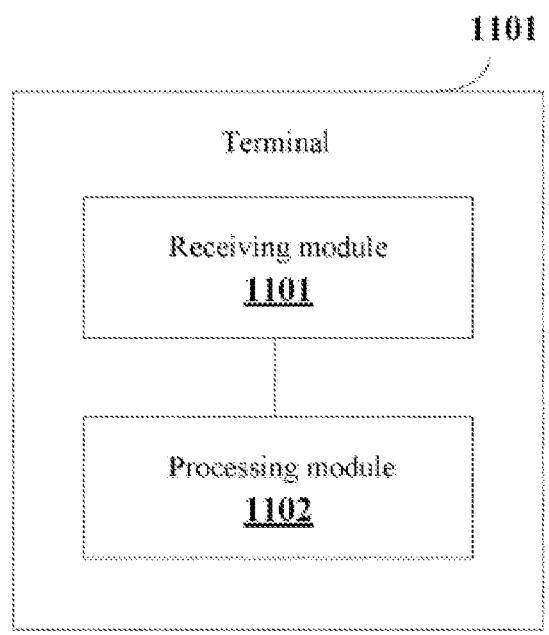
FIG. 11 is a schematic diagram of a terminal according to an embodiment of the present disclosure.

Referring to FIG. 11, the embodiments of the present disclosure further provide a terminal. The terminal 1100 includes a receiving module 1101 and a processing module 1102.

The receiving module 1101 is configured to receive cancellation indication information corresponding to a first PUSCH and receive a scheduling grant of a second PUSCH, where a priority of the first PUSCH is lower than a priority of the second PUSCH.

The second PUSCH is equivalent to a PUSCH with a high priority, and the first PUSCH is equivalent to a PUSCH with a low priority. Optionally, the time frequency resource indicated by the cancellation indication information overlaps with at least a time frequency resource of the first PUSCH.

The processing module 1102 is configured to perform a corresponding terminal behavior according to time domain positions of the cancellation indication information and the scheduling grant.

In some implementations, the receiving module 1101 is further configured to: receive, before receiving cancellation indication information corresponding to a first PUSCH, a PDCCH scheduling the first PUSCH; receive the cancellation indication information corresponding to the first PUSCH before the first PUSCH scheduled by the PDCCH is sent.

That is, a time of receiving cancellation indication information corresponding to a first PUSCH and receiving a scheduling grant of a second PUSCH is after a PDCCH of the first PUSCH is received and before a PUSCH scheduled by the PDCCH is sent.

In some implementations, the processing module 1102 is further configured to: multiplex the first PUSCH and the second PUSCH in a case that the time domain position of the scheduling grant is located before the time domain position of the cancellation indication information.

It may be understood that in this embodiment of the present disclosure, the first PUSCH and the second PUSCH may be multiplexed using a resource multiplexing rule.

In some implementations, that the time domain position of the scheduling grant is located before the time domain position of the cancellation indication information means that the last symbol of a PDCCH receiving the scheduling grant is before the last symbol of a PDCCH receiving the cancellation indication information.

In some implementations, the processing module 1102 is further configured to: cancel, in a case that a time frequency resource multiplexed by the first PUSCH and the second PUSCH overlaps with a time frequency resource indicated by the cancellation indication information, transmission on the time frequency resource indicated by the cancellation indication information. Specifically, transmission on a resource that is in the time frequency resource indicated by the cancellation indication information and that overlaps with the time frequency resource multiplexed is canceled.

In some implementations, the processing module 1102 is further configured to: perform one of the following terminal behaviors in a case that the time domain position of the cancellation indication information is located before the time domain position of the scheduling grant: (1) canceling transmission of the first PUSCH; or (2) canceling transmission on a time frequency resource indicated by the cancellation indication information.

In some implementations, that the time domain position of the cancellation indication information is located before the time domain position of the scheduling grant means that the last symbol of a PDCCH receiving the scheduling grant is before the last symbol of a PDCCH receiving the cancellation indication information.

In some implementations, the processing module 1102 is further configured to: cancel transmission of the first PUSCH in a case that a time frequency resource of the second PUSCH does not overlap with the time frequency resource indicated by the cancellation indication information; or cancel transmission of the first PUSCH and performing transmission of the second PUSCH in a case that a time frequency resource of the second PUSCH overlaps with the time frequency resource indicated by the cancellation indication information.

In some implementations, the processing module 1102 is further configured to: cancel transmission of the first PUSCH and the second PUSCH in a case that a time frequency resource of the second PUSCH overlaps with the time frequency resource indicated by the cancellation indication information.

It may be noted that in this case, canceling the transmission of the second PUSCH may be canceling partial transmission of the second PUSCH or entire transmission of the second PUSCH. If the second PUSCH still has a DMRS at a position other than the time frequency resource indicated by the cancellation indication information, the terminal can still transmit a PUSCH of a time frequency resource of the second PUSCH other than the time frequency resource indicated by the cancellation indication information.

In some implementations, based on the illustration of FIG. 11, the receiving module 1101 is further configured to: receive first information, where the first information indicates whether the terminal cancels transmission of the second PUSCH in a case that a time frequency resource of the second PUSCH on the terminal overlaps with a time frequency resource indicated by the cancellation indication information;

The terminal provided in the embodiments of the present disclosure may perform the embodiment shown in FIG. 2. Their implementation principles and technical effects are similar. In this embodiment, details are not described herein again.

Figure 12:
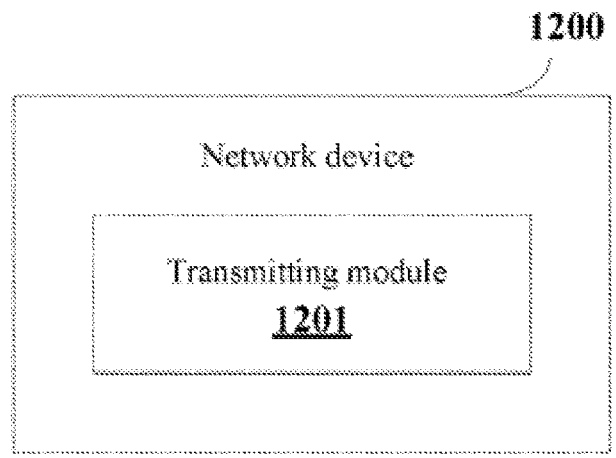
FIG. 12 is a schematic diagram of a network device according to an embodiment of the present disclosure.

Referring to FIG. 12, the embodiments of the present disclosure further provide a network device. The network device 1200 includes:

a transmitting module 1201, configured to send cancellation indication information corresponding to a first PUSCH, where a time frequency resource indicated by the cancellation indication information does not overlap with a time frequency resource multiplexed by the first PUSCH and second PUSCH; and/or the time frequency resource indicated by the cancellation indication information does not overlap with a time frequency resource of the second PUSCH, where a priority of the first PUSCH is lower than a priority of the second PUSCH.

The second PUSCH is equivalent to a PUSCH with a high priority, and the first PUSCH is equivalent to a PUSCH with a low priority.

Optionally, the time frequency resource indicated by the cancellation indication information overlaps with at least a time frequency resource of the first PUSCH.

In some implementations, the transmitting module 1201 is further configured to send first information to a terminal, where the first information indicates whether the terminal cancels transmission of the second PUSCH in a case that a time frequency resource of the second PUSCH on the terminal overlaps with the time frequency resource indicated by the cancellation indication information. For example, the first information is sent to the terminal through RRC signaling.

The network device provided in the embodiments of the present disclosure may perform the embodiment shown in FIG. 7. Their implementation principles and technical effects are similar. In this embodiment, details are not described herein again.

Figure 13:
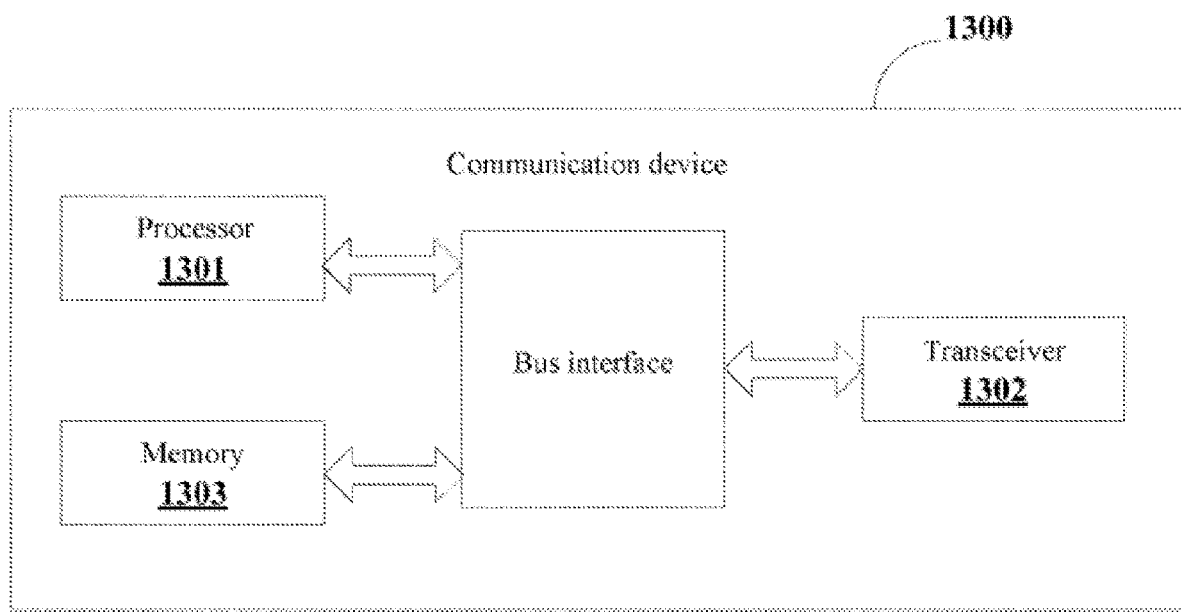
FIG. 13 is a schematic diagram of a communication device according to an embodiment of the present disclosure.

FIG. 13 is a structural diagram of a communication device according to an embodiment of the present disclosure application. As shown in FIG. 13, the communication device 1300 includes: a processor 1301, a transceiver 1302, a memory 1303, and a bus interface. The processor 1301 may be responsible for management of the bus architecture and normal processing. The memory 1303 may store data used by the processor 1301 when the processor 1301 performs an operation.

In an embodiment of the present disclosure, the communication device 1300 further includes a computer program stored on the memory 1303 and executable on the processor 1301. When executed by the processor 1301, the computer program implements the steps of the method shown in FIG. 2 or FIG. 7.

In FIG. 13, a bus architecture may include any quantity of interconnected buses and bridges, and specifically connects together circuits that are of one or more processors represented by the processor 1301 and of a memory represented by the memory 1303. The bus architecture may further connect various other circuits of a peripheral device, a voltage regulator, a power management circuit, and the like. This is well known in the art, and therefore, no further description is provided in this specification. The bus interface provides an interface. The transceiver 1302 may be a plurality of components, including a transmitter and a transceiver, and providing units for communicating with various other apparatuses on a transmission medium.

The communication device provided in the embodiments of the present disclosure may perform the method embodiment shown in FIG. 2 or FIG. 7. Their implementation principles and technical effects are similar. In this embodiment, details are not described herein again.

Steps of the methods or algorithms described with reference to the content disclosed in the present disclosure may be implemented by hardware, or may be implemented by a processor executing a software instruction. The software instruction may include a corresponding software module. The software module may be stored in a random access memory (RAM), a flash memory, a memory (ROM), an erasable programmable read only memory (EPROM), an electrically erasable programmable read only memory (Electrically EPROM, EEPROM), a register, a hard disk, a mobile hard disk, a compact disc read-only memory, or a storage medium in any other forms well-known in the art. For example, a storage medium is coupled to a processor, so that the processor can read information from the storage medium or write information into the storage medium. Certainly, the storage medium may be a component of the processor. The processor and the storage medium may be carried in an application-specific integrated circuit (ASIC). In addition, the ASIC may be carried in a core network interface device. Certainly, the processor and the storage medium may exist in the core network interface device as discrete components.

A person skilled in the art should be aware of that in the one or more examples, the functions described in the present disclosure may be implemented by hardware, software, firmware, or a combination of the above. When implemented by using software, the functions can be stored in a computer-readable medium or can be used as one or more instructions or code in a computer-readable medium for transferring. The computer-readable medium includes a computer storage medium and a communication medium, where the communication medium includes any medium that enables a computer program to be transmitted from one place to another. The storage medium may be any available medium accessible to a general-purpose or dedicated computer.

The foregoing specific implementations further describe the objectives, technical solutions in detail, and beneficial effects of the present disclosure. It should be appreciated that the foregoing descriptions are merely specific implementations of the present disclosure, but are not intended to limit the protection scope of the present disclosure. Any modification, equivalent replacement, or improvement made based on the technical solutions of the present disclosure should fall within the protection scope of the present disclosure.

A person skilled in the art should understand that the embodiments of the present disclosure may be provided as a method, a system, or a computer program product. Therefore, the embodiments of the present disclosure may use a form of hardware-only embodiments, software-only embodiments, or embodiments with a combination of software and hardware. Moreover, the embodiments of the present disclosure may use a form of a computer program product that is implemented on one or more computer-usable storage media (including but not limited to a disk memory, a CD-ROM, an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of the present disclosure without departing from the scope of the present disclosure. In this case, if the modifications and variations made to the embodiments of the present disclosure fall within the scope of the claims of this application and equivalent technologies thereof, this application also intends to include these changes and variations.

What is claimed is:

1. An uplink transmission method, applied to a terminal, comprising:
receiving first information, wherein the first information indicates whether to cancel transmission of a second physical uplink shared channel (PUSCH) in a case that a time frequency resource of the second PUSCH overlaps with a time frequency resource indicated by a cancellation indication information;
receiving cancellation indication information corresponding to a first physical uplink shared channel (PUSCH) and receiving a scheduling grant of a second PUSCH, wherein a priority of the first PUSCH is lower than a priority of the second PUSCH; and
performing a corresponding terminal behavior according to the first information and the cancellation indication information and the scheduling grant.

2. The method according to claim 1, wherein the method further comprises:
receiving a physical downlink control channel (PDCCH) scheduling the first PUSCH; and
the step of receiving cancellation indication information corresponding to a first PUSCH comprises:
receiving the cancellation indication information corresponding to the first PUSCH before the first PUSCH scheduled by the PDCCH is sent.

3. The method according to claim 1, wherein the performing a corresponding terminal behavior according to the first information and the cancellation indication information comprises:
performing a corresponding terminal behavior according to the first information and time domain positions of the cancellation indication information and the scheduling grant;
wherein the step of performing a corresponding terminal behavior according to the first information and time domain positions of the cancellation indication information and the scheduling grant comprises:
cancelling, in a case that a time frequency resource multiplexed by the first PUSCH and the second PUSCH overlaps with a time frequency resource indicated by the cancellation indication information, transmission on the time frequency resource indicated by the cancellation indication information according to the first information, in a case that the time domain position of the scheduling grant is located before the time domain position of the cancellation indication information.

4. The method according to claim 3, wherein that the time domain position of the scheduling grant is located before the time domain position of the cancellation indication information means that the last symbol of a physical downlink control channel (PDCCH) receiving the scheduling grant is before the last symbol of a PDCCH receiving the cancellation indication information.

5. The method according to claim 3, wherein the step of canceling transmission on the time frequency resource indicated by the cancellation indication information comprises:
canceling transmission on a resource that is in the time frequency resource indicated by the cancellation indication information and that overlaps with the time frequency resource multiplexed.

6. The method according to claim 1, wherein the performing a corresponding terminal behavior according to the first information and the cancellation indication information comprises:
performing a corresponding terminal behavior according to the first information and time domain positions of the cancellation indication information and the scheduling grant;
wherein the step of performing a corresponding terminal behavior according to the first information and time domain positions of the cancellation indication information and the scheduling grant comprises:
performing one of the following terminal behaviors in a case that the time domain position of the cancellation indication information is located before the time domain position of the scheduling grant:
canceling transmission of the first PUSCH; or
canceling transmission on a time frequency resource indicated by the cancellation indication information.

7. The method according to claim 6, wherein the step of canceling transmission on the time frequency resource indicated by the cancellation indication information comprises:

canceling transmission of the first PUSCH and the second PUSCH in a case that a time frequency resource of the second PUSCH overlaps with the time frequency resource indicated by the cancellation indication information.

8. The method according to claim 1, wherein the step of receiving first information comprises:
receiving the first information through Radio Resource Control (RRC) signaling.

9. The method according to claim 1, wherein the step of performing a corresponding terminal behavior according to time domain positions of the cancellation indication information and the scheduling grant comprises:
canceling, if the first information indicates not canceling transmission of the second PUSCH in a case that the time frequency resource of the second PUSCH overlaps with the time frequency resource indicated by the cancellation indication information, transmission of the first PUSCH and performing transmission of the second PUSCH in a case that the time frequency resource of the second PUSCH overlaps with the time frequency resource indicated by the cancellation indication information; and
canceling, if the first information indicates canceling transmission of the second PUSCH in a case that the time frequency resource of the second PUSCH overlaps with the time frequency resource indicated by the cancellation indication information, transmission of the first PUSCH and the second PUSCH in a case that the time frequency resource of the second PUSCH overlaps with the time frequency resource indicated by the cancellation indication information.

10. An uplink transmission indication method, applied to a network device, comprising:
sending cancellation indication information corresponding to a first physical uplink shared channel (PUSCH), wherein the time frequency resource indicated by the cancellation indication information overlaps with a time frequency resource of a second PUSCH, wherein a priority of the first PUSCH is lower than a priority of the second PUSCH;
sending first information to a terminal, wherein the first information indicates whether the terminal cancels transmission of the second PUSCH in a case that a time frequency resource of the second PUSCH on the terminal overlaps with the time frequency resource indicated by the cancellation indication information.

11. The method according to claim 10, wherein the step of sending first information to a terminal comprises:
receiving the first information through Radio Resource Control (RRC) signaling.

12. A terminal, comprising: a processor, a memory, and a program stored on the memory and executable on the processor, wherein when executed by the processor, the program implements the steps of:
receiving first information, wherein the first information indicates whether to cancel transmission of a second physical uplink shared channel (PUSCH) in a case that a time frequency resource of the second PUSCH overlaps with a time frequency resource indicated by a cancellation indication information;
receiving cancellation indication information corresponding to a first physical uplink shared channel (PUSCH) and receiving a scheduling grant of the second PUSCH, wherein a priority of the first PUSCH is lower than a priority of the second PUSCH; and performing a corresponding terminal behavior according to the first information and the cancellation indication information.

13. The terminal according to claim 12, wherein when executed by the processor, the program implements the steps of:
receiving a physical downlink control channel (PDCCH) scheduling the first PUSCH; and
the step of receiving cancellation indication information corresponding to a first PUSCH comprises:
receiving the cancellation indication information corresponding to the first PUSCH before the first PUSCH scheduled by the PDCCH is sent.

14. The terminal according to claim 12, wherein when executed by the processor, the program implements the steps of:
performing a corresponding terminal behavior according to the first information and time domain positions of the cancellation indication information and the scheduling grant;
wherein the step of performing a corresponding terminal behavior according to the first information and time domain positions of the cancellation indication information and the scheduling grant comprises:
canceling, in a case that a time frequency resource multiplexed by the first PUSCH and the second PUSCH overlaps with a time frequency resource indicated by the cancellation indication information, transmission on the time frequency resource indicated by the cancellation indication information according to the first information, in a case that the time domain position of the scheduling grant is located before the time domain position of the cancellation indication information.

15. The terminal according to claim 12, wherein when executed by the processor, the program implements the steps of:
receiving the first information through Radio Resource Control (RRC) signaling.

16. The terminal according to claim 12, wherein when executed by the processor, the program implements the steps of:
canceling, if the first information indicates not canceling transmission of the second PUSCH in a case that the time frequency resource of the second PUSCH overlaps with the time frequency resource indicated by the cancellation indication information, transmission of the first PUSCH and performing transmission of the second PUSCH in a case that the time frequency resource of the second PUSCH overlaps with the time frequency resource indicated by the cancellation indication information; and
canceling, if the first information indicates canceling transmission of the second PUSCH in a case that the time frequency resource of the second PUSCH overlaps with the time frequency resource indicated by the cancellation indication information, transmission of the first PUSCH and the second PUSCH in a case that the time frequency resource of the second PUSCH overlaps with the time frequency resource indicated by the cancellation indication information.

17. The method according to claim 2, wherein the step of receiving cancellation indication information corresponding to a first PUSCH comprises:
receiving the cancellation indication information after receiving the PDCCH scheduling the first PUSCH.

18. The method according to claim 10, further comprising:
sending a physical downlink control channel (PDCCH) scheduling the first PUSCH;
wherein the step of sending cancellation indication information corresponding to a first physical uplink shared channel (PUSCH) comprises:
sending the cancellation indication information corresponding to the first PUSCH before the first PUSCH scheduled by the PDCCH is sent.

19. The method according to claim 18, wherein the step of sending cancellation indication information corresponding to a first physical uplink shared channel (PUSCH) comprises:
sending the cancellation indication information after Sending the PDCCH scheduling the first PUSCH.

20. A network device, comprising: a processor, a memory, and a program stored on the memory and executable on the processor, wherein when executed by the processor, the program implements the steps of:
sending cancellation indication information corresponding to a first physical uplink shared channel (PUSCH), wherein the time frequency resource indicated by the cancellation indication information overlaps with a time frequency resource of second PUSCH, wherein a priority of the first PUSCH is lower than a priority of the second PUSCH;
sending first information to a terminal, wherein the first information indicates whether the terminal cancels transmission of the second PUSCH in a case that a time frequency resource of the second PUSCH on the terminal overlaps with the time frequency resource indicated by the cancellation indication information.

* * * * *